United States Patent [19]

Hultine

[11] Patent Number: 4,615,553
[45] Date of Patent: Oct. 7, 1986

[54] AUXILIARY SHOVEL HANDLE

[76] Inventor: Donald W. Hultine, R.R. 3, Box 79, Harvard, Nebr. 68944

[21] Appl. No.: 818,192

[22] Filed: Jan. 13, 1986

[51] Int. Cl.$^4$ ............................ A01B 1/22; B25G 1/04
[52] U.S. Cl. ......................................... 294/58; 16/115
[58] Field of Search .................... 294/19.1, 26, 57, 58, 294/54.5; 16/114 R, 115; 403/108, 109, 377–379

[56] References Cited

U.S. PATENT DOCUMENTS

| 911,291 | 2/1909 | Byor | 294/58 |
| 933,647 | 9/1909 | Hunt | 294/58 |
| 1,456,879 | 5/1923 | Newman | 294/58 |
| 1,586,056 | 5/1926 | Walsh | 294/58 |
| 2,826,835 | 3/1958 | O'Shea | 294/58 |
| 4,050,728 | 9/1977 | Davidson | 294/58 |
| 4,229,033 | 10/1980 | Vosbikian | 294/58 |

FOREIGN PATENT DOCUMENTS 464593 4/1950 Canada ................................. 294/58

Primary Examiner—Johnny D. Cherry
Attorney, Agent, or Firm—Zarley, McKee, Thomte, Voorhees & Sease

[57] ABSTRACT

An auxiliary handle for attachment to the primary handle of a conventional shovel includes upper and lower handle portions which are connected together for length adjustable sliding movement relative to one another. Coacting stops on the upper and lower handle portions limit the extent of relative sliding movement therebetween. A biasing mechanism urges the upper handle portion downwardly toward the retracted position thereof. Furthermore, the range of extendible lengths for the auxiliary handle may be adjusted to accommodate different users.

10 Claims, 3 Drawing Figures

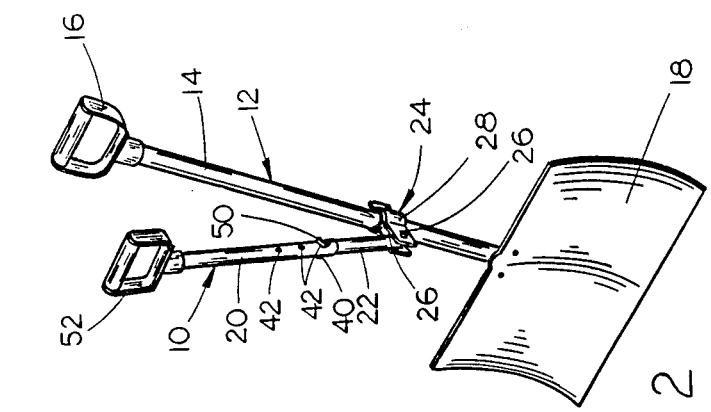
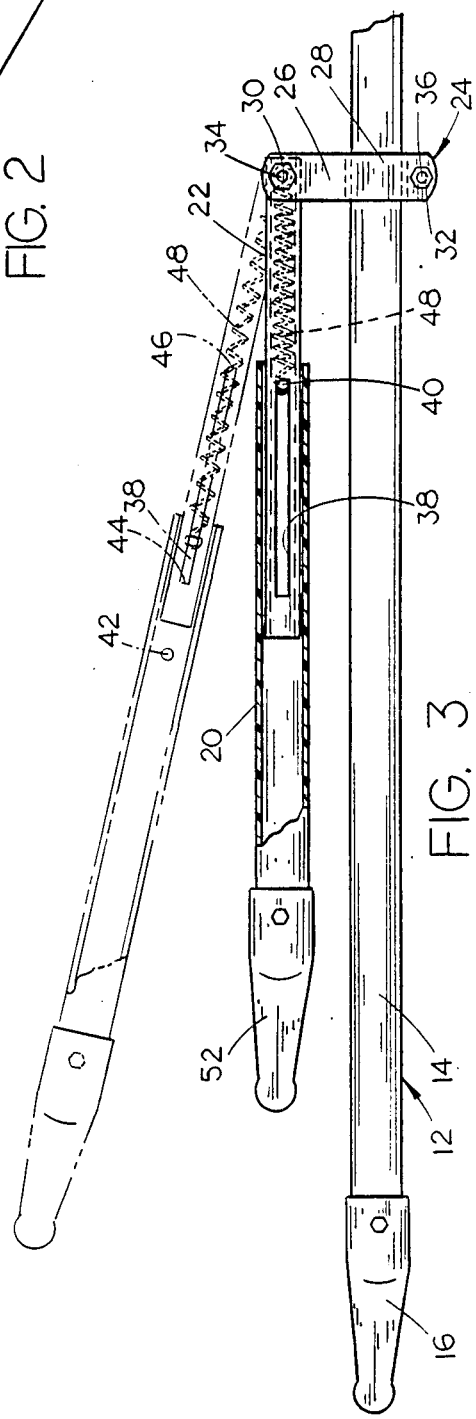
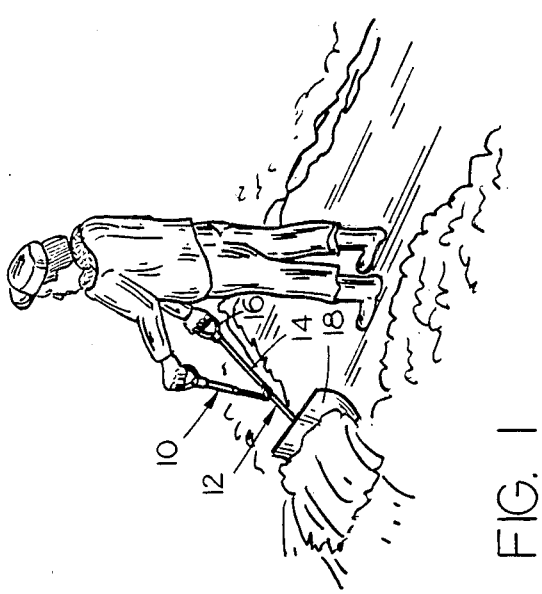
FIG. 1
FIG. 2
FIG. 3

AUXILIARY SHOVEL HANDLE

BACKGROUND OF THE INVENTION

The present invention is directed generally to a pivotal second handle for an otherwise conventional shovel and more particularly to a pivotal second handle which is extendable and retractable in use but which is biased to the retracted length thereof.

Pivotal auxiliary handles for shovels, generally, are known. Reference is made to Byor U.S. Pat. No. 911,291 and Hunt U.S. Pat. No. 933,647. Whereas the length of the auxiliary handles shown in these patents could be adjusted by a bolt and nut connection, once adjusted, the respective auxiliary handles remain of a fixed length during use. Whereas these auxiliary shovels facilitated the lifting of a loaded shovel and lessened the associated strain on the operator, their effectiveness was limited.

Accordingly, a primary object of the present invention is to provide an improved auxiliary shovel handle.

Another object is to provide an auxiliary shovel handle which is extended and retracted during use of the shovel as a function of the forces acting on the shovel.

Another object is to provide an auxiliary shovel handle including upper and lower handle portions which are movable relative to one another between extended and retracted positions and wherein the handle portions are biased toward the retracted positions thereof.

Another object is to provide an auxiliary shovel handle wherein the range of lengths for the auxiliary handle may be adjusted to accommodate different users.

Finally, another object is to provide an auxiliary shovel handle which is simple and durable in construction, easy to manufacture and install and efficient in operation.

SUMMARY OF THE INVENTION

The auxiliary shovel handle of the present invention is adapted for attachment to a conventional shovel having an elongated primary handle and a shovel blade at the lower end thereof. The auxiliary handle includes upper and lower handle portions connected together for length-adjustable sliding movement relative to one another. The lower end of the lower handle portion is pivotally connected to the primary handle at a selected position therealong. Coacting stop means on the upper and lower handle portions, such as a pin and slot connection, limit sliding movement of the upper handle portion relative to the lower handle portions between extended and retracted positions defined by engagement of the pin with the opposite ends of the slot. A biasing member such as a tension spring urges the upper handle portion to its retracted position.

Longitudinal spaced-apart pin holes may be provided in one of the handle portions so that the range of lengths of the auxiliary handle may be adjusted to accommodate different users.

The auxiliary shovel handle of the present invention is readily adapted for attachment to a snow shovel, grain scoop or any other type of shovel. It enables the user of the shovel to lift and throw loads carried by the shovel blade without bending of the user's back. Furthermore, the user's ability to throw a load carried on the shovel is actually enhanced by use of the auxiliary shovel handle since the internal spring action of the auxiliary handle contributes to the user's throwing force.

BRIEF DESCRIPTION OF THE DRAWINGS

FIG. 1 is a diagrammatic illustration of the auxiliary shovel handle in use on a conventional shovel;

FIG. 2 is a perspective view of the auxiliary shovel handle installed on a conventional shovel; and FIG. 3 is a side sectional view of the auxiliary shovel handle, with dotted lines indicating an extended position for the upper handle portion.

DESCRIPTION OF THE PREFERRED EMBODIMENT

The auxilliary shovel handle 10 of the present invention is shown in the drawings secured to a conventional shovel 12 having an elongated primary handle 14 with a grip member 16 at the upper end thereof and a shovel blade 18 at the lower end thereof.

The auxiliary shovel handle 10, in the preferred embodiment, includes upper and lower handle portions 20 and 22 in the form of elongated telescoping tubular members for length adjustable sliding movement relative to one another. Whereas the drawings show the lower handle portion 22 received within the upper handle portion 20, the opposite arrangement could also be operative. Whereas a telescoping connection between the handle portions is preferred, any other sliding connection which permits the extension and retraction of the overall auxiliary handle could be used as well.

A pivotal mounting bracket 24 is provided for pivotally securing the lower end of the lower handle portion 22 to the primary handle 14 at a selected position therealong. Mounting bracket 24 may include a pair of generally rigid plates 26, each having an arcuate medial portion 28 and bolt holes 30 and 32 in the opposite ends thereof.

During assembly of the auxiliary handle 10, the mounting plates 26 are positioned with the concave surfaces of the medial portions 28 facing one another. The lower handle portion 22 has a transverse bolt hole through the lower end thereof which is registered with holes 30 of plates 26 so that a bolt 34 can be extended therethrough and secured with a wing nut. Accordingly, to secure the auxiliary handle to a primary handle 14, the free ends of plates 26 are flexed outwardly to permit the insertion of the primary handle between the concave faces of the arcuate medial portions 28 of plates 26. A second bolt 36 is then inserted through the registered holes 32 and a wing nut is applied to bolt 36 to securely clamp the mounting bracket at the selected position along the primary handle. Adjustment of the mounting bracket is easily accomplished by simply loosening the wing nut on bolt 36, sliding the plates 26 to the desired position and retightening the wing nut on bolt 36.

Length adjustability of the auxiliary handle 10 is limited by coacting stop means on the upper and lower handle portions 20 and 22. In the preferred embodiment shown, the coacting stop means includes a pair of elongated slots 38 arranged in registered relation on opposite sides of the lower handle portion 22 for receiving a pin 40 which is extended transversely through a selected pin hole 42 near the lower end of the upper handle portion 20. Thus the engagement of pin 40 with the upper and lower ends 44 and 46 of slots 38, respectively, defines the extended and retracted positions for the upper handle portion 20.

A tension spring 48 has hooks at the opposite ends which are fastened over bolt 30 and pin 40 for urging the upper handle portion downwardly to the retracted position thereof. A nine pound test spring has been satisfactorily used on a scoop shovel equipped with an auxiliary handle 10 although the auxiliary handle tended to bottom out in the fully extended position when the scoop was filled with corn.

Whereas the extent of extending and retracting movement of the upper handle portion 20 is defined by the length of slots 38, the range of lengths for the auxiliary handle 10 may be separately adjusted by selecting anyone of several longitudinally spaced-apart pinholes 42 for pin 40. Pin 40 is provided as a bolt having a wing nut 50 secured on the end thereof for tooless adjustment. Thus the range of operating lengths for the auxiliary handle will be longest when the lowermost pinhole 42 on upper handle portion 20 is selected and the range of operating lengths for the auxiliary handle will be shortest when the uppermost pinhole 42 is selected. This adjustment accommodates the different height, arm length and preferences of different users.

For the snow shovel illustrated in the drawings, the upper end of the upper handle portion 20 may have a transverse grip member 52 secured thereon similar to the grip member 16 at the upper end of the primary handle 14.

In operation, it can be seen in FIG. 1 that snow or other material can be scooped onto the shovel without the user bending over since it is no longer necessary for one hand to grip the primary handle at a lower position adjacent the shovel blade. The loaded shovel blade is easily lifted, again without bending over, simply by pulling upwardly on the grip member 52 of auxiliary handle 10 while retracting the upper end of primary handle 14 with the other hand. This causes a certain extension of spring 48 within the auxiliary handle and a resulting extension of the auxiliary handle. Upon a forward pushing movement of the hand engaging the upper end of the primary handle 14 for throwing the material supported on the shovel blade, the spring 14 tends to retract thereby contributing to the throwing force and resulting in a further throwing distance than would be possible by an operator using the same amount of exertion without the auxiliary handle.

Auxiliary handle 10 of the present invention will not only prevent many of the untold number of back injuries to users of shovels but will also increase the efficiency and effectiveness of those users as described.

Thus there has been shown and disclosed an auxiliary shovel handle which accomplishes at least all of the stated objects.

I claim:

1. An auxiliary handle for a shovel having an elongated primary handle with upper and lower ends and a shovel blade at the lower end thereof, said auxiliary handle comprising elongated upper and lower handle portions, each having respective upper and lower ends, a pivotal mounting bracket on the lower end of said lower handle portion and adapted for securement to a primary handle at a selected position along the length of the primary handle for pivotally connecting the lower handle portion to the primary handle, means for connecting said handle portions together for length adjustable sliding movement relative to one another, coacting stop means on said upper and lower handle portions for limiting sliding movement of the upper handle portion relative to the lower handle portion to extended and retracted positions thereof, and means for biasing said upper handle portion to the retracted position thereof.

2. The auxiliary handle of claim 1 wherein said mounting bracket is such that, upon securement of said mounting bracket to a primary handle, said lower handle portion is supported for pivotal movement about an axis extended transversely of the primary handle.

3. The auxiliary handle of claim 1 wherein one of said upper and lower handle portions is telescopically slidably received within the other of said upper and lower handle portions.

4. The auxiliary handle of claim 1 wherein said coacting stop means comprises a pin and slot connection.

5. The auxiliary handle of claim 4 wherein said pin and slot connection comprises an elongated slot through one of said upper and lower handle portions, said slot having opposite ends, and a pin extended through the other of said upper and lower handle portions and said slot, said pin being engageable with the opposite ends of said slot to limit relative movement of said other of the upper and lower handle portions.

6. The auxiliary handle of claim 5 further comprising adjustment means for adjusting the range of extended and retracted lengths of the auxiliary handle to accommodate different users.

7. The auxiliary handle of claim 6 wherein said adjustment means comprises a plurality of longitudinally spaced-apart holes through the other of said upper and lower handle portions for receiving said pin in any selected one of said holes.

8. The auxiliary handle of claim 1 further comprising adjustment means for adjusting the range of extended and retracted lengths of the auxiliary handle to accommodate different users.

9. The auxiliary handle of claim 1 wherein said means for biasing said upper handle portion comprises a tension spring having one end connected to said upper portion and an opposite end secured adjacent the lower end of said lower handle portion.

10. A shovel comprising an elongated primary handle with upper and lower ends, a shovel blade at the lower end of the elongated primary handle, and an auxiliary handle comprising, elongated upper and lower handle portions, each having respective upper and lower ends, a pivotal mounting bracket on the lower end of said lower handle portion and secured to the primary handle at a selected position along the length thereof for pivotally connecting the lower handle portion to the primary handle, means for connecting said handle portions together for length adjustable sliding movement relative to one another, coacting stop means on said upper and lower handle portions for limiting sliding movement of the upper handle portion relative to the lower handle portion to extended and retracted positions thereof, and means for biasing said upper handle portion to the retracted position thereof.

* * * * *